United States Patent

[11] 3,555,985

| [72] | Inventors | Hiroshi Ueda<br>Nara;<br>Hideo Takeuchi, Gamagori, Japan |
|---|---|---|
| [21] | Appl. No. | 694,311 |
| [22] | Filed | Dec. 28, 1967 |
| [45] | Patented | Jan. 19, 1971 |
| [73] | Assignee | Minolta Camera Kabushiki Kaisha<br>Minami-ku, Osaka, Japan |
| [32] | Priority | Dec. 29, 1966, Feb. 24, 1967, Oct. 7, 1967 |
| [33] | | Japan |
| [31] | | 42/356, 42/15,578 and 42/85,548 |

[54] SINGLE-BLADE SHUTTER CAMERA WITH AN EXPOSURE METER INTERLOCKING MECHANISM
4 Claims, 12 Drawing Figs.

[52] U.S. Cl. ................................................ 95/10,
95/59, 95/64
[51] Int. Cl. ......................................................... G03b 7/14,
G03b 9/10
[50] Field of Search ............................................ 95/10C, 53,
59, 62, 64C

[56] References Cited
UNITED STATES PATENTS

| 3,106,144 | 10/1963 | Peterson et al. ............ | 95/53X |
| 3,125,937 | 3/1964 | Bing et al. ................... | 95/64CX |
| 3,400,646 | 9/1968 | Kider et al. ................. | 95/10(C) |
| 3,417,682 | 12/1968 | Landbrecht ................. | 95/10(C) |

Primary Examiner—Norton Ansher
Assistant Examiner—Joseph F. Peters, Jr.
Attorney—Anthony A. O'Brien ABSTRACT: A camera with a built-in exposure meter having a single-blade shutter, comprising an exposure meter interlocking mechanism including first and second members, each having a notch to form a lens aperture in a cooperative manner. The first member has a cam surface engageable with the pointer of the exposure meter to sense the position thereof, to control the shutter speed by mechanical engagement of an abutment member of the shutter blade with the first member. The momentum of the first member is regulated by the engagement of the cam surface with the pointer, while the displacement of the second member is adapted to be responsive to the momentum of the first member, so that the lens aperture is also controlled by the position of the pointer.

SINGLE-BLADE SHUTTER CAMERA WITH AN EXPOSURE METER INTERLOCKING MECHANISM

This invention relates to a camera with a built-in exposure meter having a single-blade shutter. More particularly the invention relates to a camera with a built-in exposure meter having a single-blade shutter, which comprises an exposure interlocking means including an exposure meter, a shutter, and an interlocking mechanism, all mounted on a common base plate; and exposure pointer clamping means without a separate clamping member to be disposed apart from an interlocking member with a cam surface; and an automatic lens aperture control means to automatically determine the degree of lens aperture in response to the brightness of an object to be photographed.

The exposure interlocking means usable in the camera according to the present invention includes a programmed electric eye (to be referred to as EE hereinafter) mechanism. In one form of the program for the EE mechanism, for different brightness of the photographic object, the degree of lens aperture is at first changed while maintaining the shutter speed at a highest level, and then as the lens aperture comes to the "full open," the lens aperture is kept at the full open position to change the shutter speed so as to meet the brightness of the photographic object. In another form of the program, the degree of lens aperture is also changed at first while maintaining the shutter speed at a highest level, and then as the lens aperture comes close to the full open position, both the lens aperture and the shutter speed are simultaneously controlled, and finally as the lens aperture reaches the extreme full open position, only the shutter speed is changed while keeping the lens aperture at the full open position. With such programmed EE mechanism, the exposure can be controlled in a wider range than that of lens aperture EE mechanism or shutter speed EE mechanism.

Generally speaking, in manufacturing EE cameras for beginners, camera shaking by the hand at the time of shutter actuation is the most serious factor to be considered. The aforesaid programmed EE mechanism provides the highest possibility of operating the shutter at the quickest speed for any photographable brightness of the object, to minimize the adverse effect of camera shaking. With a known EE camera, which controls both the lens aperture and the shutter speed simultaneously, the exposure time tends to be longer to cause blurring of image even for minor camera shaking.

In the former form of the programmed EE mechanism usable in the present invention, only one of the two variables, the shutter speed and the lens aperture, is changed at a time, while in the latter form of the programmed EE mechanism, only one of the two variables is controlled at a time for most part of the operation, except a very narrow range in which both variables are controlled simultaneously. Even in the above narrow range, the exposure meter operates at about the middle of its sensitive range, and accordingly, the pointer deflection for a given brightness difference is large and the accuracy is very high. In short, with the camera according to the present invention, one of the common causes of exposure error is avoided to improve the accuracy thereof.

Therefore, an object of the present invention is to provide a camera with a built-in exposure meter having a programmed exposure interlocking means of the aforesaid type and a lens means of comparatively small diameter, said interlocking means operating substantially continuously without steps for the entire exposable range. The camera according to the present invention also consists of the minimum number of parts to simplify the process of assembly and adjustment following the assembly, and its lens aperture is not of slot type but of an automatically settable rectangular type having a preferable lens characteristic. The structure of the camera according to the present invention is sturdy and adapted to protect the exposure meter pointer from mechanical shocks.

In a commonly used exposure meter interlocking mechanism, the operative position of the exposure meter pointer for a given brightness of a photographic object is sensed by the cam surface of an interlocking member to be brought into contact with the pointer upon actuation of a shutter release, so that the brightness thus sensed is converted into the proper lens aperture or shutter speed to give a proper exposure to the photographic film. In fact, the pointer is temporarily clamped by said cam surface and a pointer receiver. When the pointer is thus clamped on the pointer receiver, the phenomenon of pointer jumping does not take place, provided that the angle of obliquity of action between the cam surface and the pointer receiver during the interlocking action for converting the sensed brightness into the lens aperture or shutter speed is within the magnitude of a friction angle. However, it is usually very difficult to always limit the aforesaid angle of obliquity of action within the friction angle in converting the brightness sensed by the exposure meter into shutter speed or lens aperture. If the aforesaid angle of obliquity of action should be always kept within the friction angle, the magnitude of that portion of the interlocking member, which corresponds to the brightness of the photographic object, becomes so small that a stroke amplifier is usually necessitated in order to convert the stroke of such small portion into the desired lens aperture or shutter speed.

For such reasons, the cam surface to be brought into contact with the exposure meter pointer is usually formed in steps, so as to provide steplike displacement of the interlocking member. Such steplike cam surface has a disadvantage in that when the exposure meter pointer rests on the corner of a step thereof, the pointer tends to make an irregular jump to result in a serious error. To eliminate the aforesaid disadvantage, a separate clamping member is proposed to be used together with a known interlocking member to hold the pointer before it comes into contact with the steplike cam surface.

Thus, another object of the present invention is to provide an improved pointer clamping means, with which manufacturing process can be simplified by dispensing with the manufacturing process of mounting of spring means and screws onto the clamping member and adjusting of clamping member stroke, because the clamping member is separate from the interlocking member. Furthermore, the exposure error due to pointer jumping is eliminated.

Moreover, a known automatic lens aperture control mechanism has a disadvantage in that it comprises a great number of parts to cause a considerable reduction of the accuracy of the product while the chance of such error is also increased due to the fact that a shutter side aperture control mechanism and an exposure meter side cam mechanism are usually mounted separately and then interconnected with each other through an intermediate member.

It is another object of the present invention to obviate such difficulty of conventional aperture control mechanism by providing an improved automatic aperture control mechanism having a shutter side aperture control mechanism integrally formed with an exposure meter side cam mechanism, so that the number of parts therefor is minimized to improve the accuracy of the aperture control operation.

Other objects and a fuller understanding of the present invention may be had by referring to the following description in respect of preferred embodiments taken in conjunction with the accompanying drawings, in which.

Like parts are designated by like reference numerals and symbols throughout the drawings.

Figure 1:
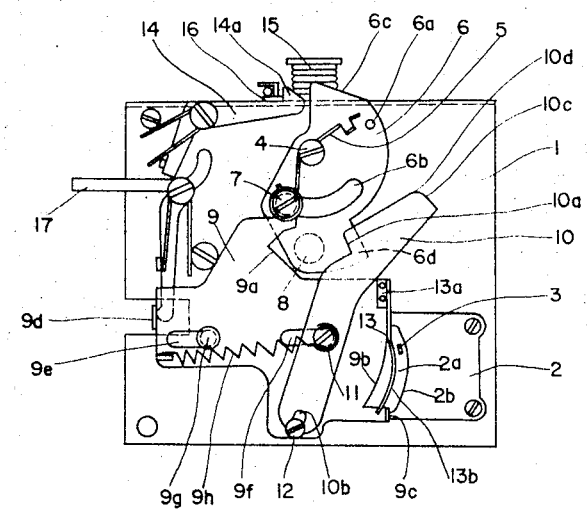
FIG. 1 is a schematic front elevation of the exposure meter interlocking mechanism of the camera according to the present invention.
Figure 5:
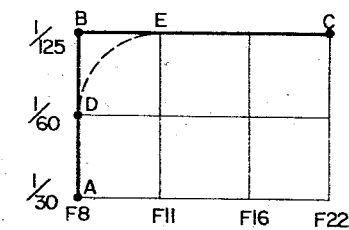
FIG. 5 is a graph showing a program of the programmed EE mechanism.
Figure 6:
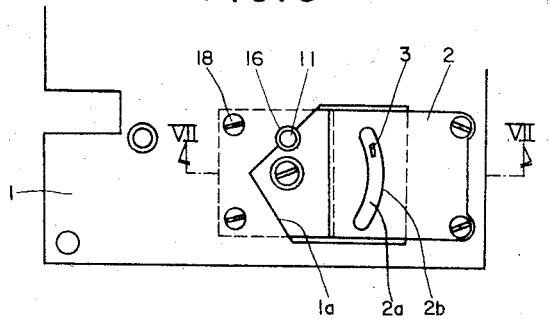
FIG. 6 is an elevation of meter base plate mounted on a shutter base plate.
Figure 7:
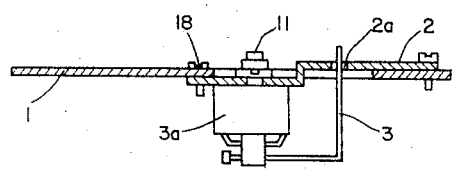
FIG. 7 is a sectional view taken along the line VII—VII of FIG. 6.

Now, referring to FIGS. 1 to 7, showing a preferable embodiment of the exposure interlocking mechanism to be used in the camera according to the present invention, FIG. 1 shows the mechanism with the shutter in the state as set. An exposure meter base plate 2 is integrally mounted on a shutter base plate 1, and a pointer receiver 2b is formed on the peripheral edge of a groove 2a bored on the exposure meter base plate 2, so that a pointer 3 of an exposure meter 3a extends through the groove 2a, as best shown in FIG. 7. A shutter blade 6 is biased in a counterclockwise direction around a shaft 4 secured to the shutter base plate 1 by a spring 5, while a stepped screw 7 fitted in an arcuate groove 6b of the shutter blade acts to hold the shutter blade against such bias force. A projected wing 6d of the shutter blade completely covers a lens means 8 under normal conditions. The shutter blade 6 further comprises a pin 6a to control the angular displacement as well as the shutter speed thereof, and a driven end portion 6c.

A first member 9 of the exposure meter interlocking mechanism has a cam surface 9b and a V-shaped notch 9a acting as an element of aperture control means of the lens means 8. A pair of guide slots 9e and 9f are bored on the first member 9, so that a pin 9g and a shaft 11 are slidably fitted in the slots 9e and 9f respectively. A spring 9h is inserted between the shutter base plate 1 and the first member 9 to bias the latter member rightwards, and the magnitude of the rightward displacement of the first member 9 due to the bias force of the spring 9g is determined by the position of the pointer 3 of the exposure meter 3a.

A second member 10 of the exposure meter interlocking mechanism is axially secured to the shaft 11 mounted on the shutter base plate 1. The second member has a groove 10b at the lower end thereof, with which a pin 12 secured to the first member 9 is operatively engaged, so that the second member can rotate around the shaft 11 at about 1 to 1 relation in opposite directions, with the first member by the engagement between the groove 10b and the pin 12. A V-shaped notch 10a of the second member cooperates with the corresponding V-shaped notch 9a of the first member to form a lens aperture control means for the leans means 8. A cam surface 10d for shutter speed interchange and a flat portion 10c, adjacent to the cam surface, are adapted to engage with the pin 6a of the shutter 6, and thereby, the shutter speed is related with the degree of lens aperture.

Now referring to FIG. 5, illustrating typical programs usable in the programmed EE mechanism of the camera according to the present invention, curve characteristics ABC represents such operation that the degree of lens aperture is at first changed while maintaining the shutter speed at a highest level, and when the lens aperture comes to the full open position, the lens aperture is kept at the full open position to change the shutter speed so as to meet the brightness of the specific photographic object. On the other hand, the curved line characteristics ADEC represent another type operation that the degree of the lens aperture is changed at first while maintaining the shutter speed at the highest level until the lens aperture increases close to the full open position, and then both the lens aperture and the shutter speed are changed simultaneously, and finally as the lens aperture reaches the extreme full open position, the shutter speed is changed.

Such programmed operation of the shutter and the lens aperture can be achieved by properly relating the notches 9a, 10a forming the aperture control means of the lens means 8 and the cam surface 10d followed by the flat portion 10c for the shutter speed interchanging. For instance, in the case of the curve ABC program, when the intermediate portion between the cam surface 10d and the flat portion 10c of the second member 10 comes to cross the locus of motion of the pin 6a of the shutter blade 6, the V-shaped notches 9a and 10a arrive at the periphery of the lens means 8, or the lens aperture is just to begin decrease from the full open position. On the other hand, in the case of the curved line ADEC characteristics, upon arrival of the aforesaid intermediate portion of the second member 10 at the locus of motion of the pin 6a, the V-shaped notches 9a and 10a have already passed through the periphery of the lens means 8 to reduce the lens aperture to some extent. In other words, with the curved line ADEC program characteristics, the shutter speed is increased to the maximum level and kept there only after the lens aperture is somewhat reduced from its full open position.

The curved line program ADEC is an improved form of the bent line program ABC. With the combination of a circular lens means and a parallelogram, or approximate parallelogram, aperture control means, as shown in FIG. 1, the stroke, or increment, of the lens aperture when the notches 9a and 10a comes close to the periphery of the lens means 8, i.e. in the vicinity of full open. Accordingly, with the commonly used operative characteristics of the exposure meter and the smoothly curved cam surface 9b of the first member 9 of the exposure meter interlocking mechanism, it is difficult to set the angle of obliquity of action between the cam surface 9b and the pointer receiver 2b within the magnitude of the friction angle. Thus, simplification and stabilization of the clamping means of the pointer can hardly be accomplished. By adopting the curved characteristics DE, or by actuating both the lens aperture and the shutter speed simultaneously in this particular intermediate portion, the configuration of the cam surface 9b can be made suitable for achieving proper angle of obliquity of action.

In the operation corresponding to the curved portion DE of the program ADEC, wherein both the shutter speed and the lens aperture are controlled simultaneously, if the angle of obliquity of action between the revolving direction of the pin 6a of the shutter blade 6 and the cam surface 10d exceeds the magnitude of the friction angle, there will be produced a component of force which rotates the second member 10 around the shaft 11 to vary the degree of the lens aperture during the shutter operation. Therefore, it is apparently preferable to provide a suitable means necessary for holding the lens aperture unchanged during the shutter operation. The reason of using a rotary lever as the second member 10 of the exposure meter interlocking mechanism, which also acts as means for interchanging the shutter speed, is as follows. Namely, with the single-blade shutter, as used in the camera according to the invention, the magnitude of displacement of the shutter blade necessary for shutter speed variation must be larger than the displacement of the V-shaped notches 9a and 10a necessary for the lens aperture variation, and a rotary lever provides an extensive freedom of choice of the magnitude of displacement to machine designers. Moreover, such rotary member can amplify the displacement of the first member for cooperation therewith.

A release lever 17, pivotally mounted on the shutter base plate 1 and biased clockwise by a suitable means, is normally held at nonreleased position by a bent portion 9d formed at the lower end of the first member 9 of the exposure meter interlocking mechanism. Upon releasing the lever 17, the bent portion 9d is allowed to move rightwards as a part of the first member 9, while being guided by the engagement of the guide slots 9e and 9f with the stepped screw 9g and the shaft 11, respectively.

A resilient member 13, secured to the first member at one end 13a thereof and forced against another bent portion 9c of the first member 9 at the opposite end thereof, has an arcuate portion 13b bent at the same radius of curvature as that of the rotation of the exposure meter pointer 3. The resilient member 13 acts to clamp the pointer 3.

A holding lever 14 also pivotally mounted on the shutter base plate 1 is biased counterclockwise and operatively engaged with the release lever 17 at the tail end thereof. A claw 14a formed at the top end of the lever 14 acts to hold an actuating lever 16 under normal condition, which actuating lever is adapted to strike the bent portion 6c of the shutter blade 6 to actuate it with the force of a coiled spring 15.

In operation, if the release lever 17 is rotated counterclockwise, against the bias force acting thereon, the first member 9 of the exposure interlocking mechanism slides rightwards, due to the bias force of the spring 9h, as described above. Thereby, the resilient member 13 comes into contact with the exposure meter pointer 3 at first, and then the cam surface 9b of the first member facing the resilient member 13 comes in touch with the pointer 3, and accordingly, the magnitude of the rightward displacement of the first member 9 is defined. In response to the displacement of the first member 9 thus defined, the second member 10 correspondingly rotates around the shaft 11 by an angle corresponding to the displacement of the first member 9, by the engagement between the pin 12 secured to the first member and the groove 10b of the second member. At the same time, the holding lever 14 is allowed to rotate clockwise by the counterclockwise rotation of the release lever 17, so that the shutter actuating lever 16 is released from the engagement with the claw 14a of the holding lever to move rightward. Thus, the actuating lever 16 strikes the shutter blade 6 at the upper end portion 6c thereof to drive it clockwise to remove the cover over the lens means 8 for exposing.

Figure 2:
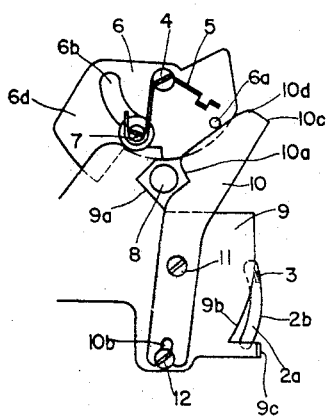
FIGS. 2 to 4 are diagrammatic illustrations of operative positions of the essential portion of the interlocking mechanism.
Figure 3:
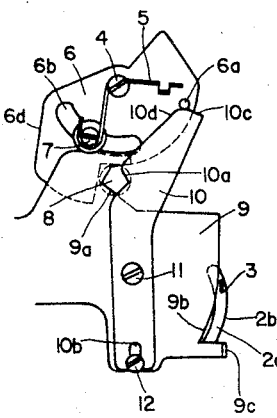
Figure 4:
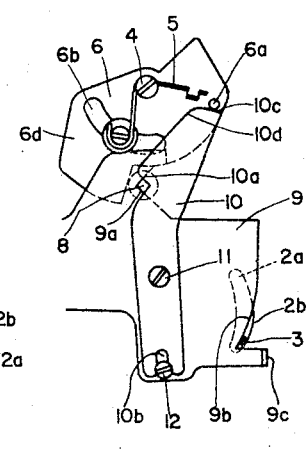

FIGS. 2 to 4 illustrate different operative positions of the essential portions of the shutter interlocking mechanism usable in the camera according to the present invention. The different operative conditions, as illustrated in the FIGS. will now be described referring to the operational program of FIG. 5.

If the brightness of the photographic object is at the lowest permissible level for a particular film loaded in the camera, or at the level corresponding to the point A of FIG. 5, the displacement of the first and second members 9 and 10 of the exposure meter interlocking mechanism is small, as shown in FIG. 2. Thus, the V-shaped notches 9a and 10a do not cover the lens means 8 at all, regardless of the diameter thereof. The pin 6a of the shutter blade 6 strikes the cam surface 10d for shutter speed interchanging at the possible furthest point from the flat portion 10c of the second member. Thus, a comparatively large exposure is given to the film, by taking a comparatively long time to rebound back to the initial position, as shown in FIG. 1.

If the brightness of the photographic object is larger than that represented by the point A, i.e. at a level corresponding to a point within a range between the point A and the point B or D of FIG. 5, the displacement of the first and second members 9 and 10 is changed but the degree of lens aperture is not changed. On the other hand, the shutter speed is changed by modifying the point at which the pin 6a of the shutter blade strikes at or rebounds from the cam surface 10d of the second member 10, which point is on the locus of the movement of the pin 6a. Here, when the object brightness is at a level corresponding to that in the range between points A and B, or between A and D, the pin 6a of the shutter blade 6 strikes the cam surface 10d of the second member to cause a minor displacement of the first and second members 9 and 10 of the exposure meter interlocking mechanism. However, such minor displacement does not vary the degree of the lens aperture, because it is in the direction to increase the lens aperture, which is already at full open position. The effect of the minor displacement of the shutter speed is also negligible, even though the shutter speed itself after the minor movement may slightly differ from that corresponding to a hypothetical stationary cam surface 10d, because the actual cam surface 10d is biased in a direction to resist the striking rotation of the shutter blade 6. In addition, the mass of the shutter blade 6 is much smaller than the total mass of the first and second members 9 and 10. Hence, the magnitude of such minor movement of the first and second members responsive to the striking by the shutter blade 6 is practically negligible.

It should be noted here that the effect of such minor movement of the first and second members 9 and 10 can easily be compensated by proper design, because the shutter speed changes linearly in the range AB or AD. It is another feature of the present invention that the direction of the impulse due to the strike by the pin 6a of the shutter blade 6 is opposite to that for holding the exposure meter pointer 3, as clearly shown in FIG. 2, and hence, such impulse does not exert any adverse effect to the pointer 3.

If the brightness of the object is at a level represented by the point E of FIG. 5, and furthermore, if the exposure meter interlocking mechanism is programmed to move along the characteristics curve ADEC, then the pin 6a of the shutter blade 6 strikes the boundary point between the cam surface 10a and the flat portion 10c of the second member 10 when the V-shaped notches 9a and 10a slightly reduces the degree of lens aperture from its full open position, as shown in FIG. 3.

If the object is brighter than the aforesaid level represented by the point E, the pin 6a of the shutter blade 6 always strikes the flat portion 10c of the second member 10, and hence, the momentum of the shutter blade is reduced to keep the shutter speed at a constant value at a high level. On the other hand, the V-shaped notches 9a and 10a of the first and second members 9 and 10 of the exposure meter interlocking mechanism move by an extent which varies depending on the particular brightness of the object in excess of the point E, so that the degree of the aperture of the lens means 8 varies correspondingly.

If the object brightness is at a level represented by the point C of FIG. 5, the lens aperture is reduced to the minimum, while keeping the shutter speed at the fastest level, as shown in FIG. 4.

As described in the foregoing, the camera having the exposure meter interlocking mechanism according to the present invention is suitable for beginners. The salient feature of the camera is in that programmed exposure meter interlocking operation, or exposure control operation, as shown by a bent line ABC or a curved line ADEC or FIG. 5 can be achieved by the coordinated movement of the first and second members 9 and 10 over the entire range of available exposure. It is also a noticeable advantage of the camera that the amount of exposure can be changed in a stepless manner.

Referring to FIGS. 6 and 7, in order to ensure the accurate operation of the exposure meter interlocking mechanism, an indexing recess 1b of semicircular shape is bored at a predetermined portion on the edge of an opening 1a formed on the shutter base plate 1 to receive the separate base plate 2 of the exposure meter 3a. In assembling the exposure meter 3a with the shutter base plate 1, the shaft 11 secured to the base plate 2 of the exposure meter is fitted in the indexing recess 1b, and then the base plate 2 is fastened to the shutter base plate 1 by suitable means, such as screws 18. Thus, the accuracy of the location of the shaft 11, and accordingly that of the aperture control of the lens means 8, which most seriously affect the accuracy of the exposure meter interlocking mechanism, can be improved. It is another feature of the camera that the aforesaid interlocking mechanism can be easily adjusted by turning the pin 12 secured to the first member 9 thereof.

Figure 8:
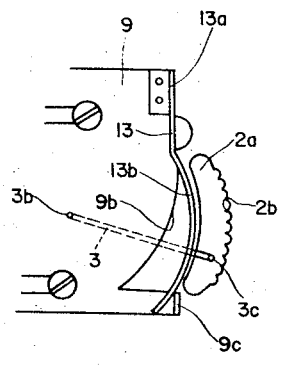
FIG. 8 is a schematic elevation of the exposure meter pointer clamping means in the camera according to the present invention.
Figure 9:
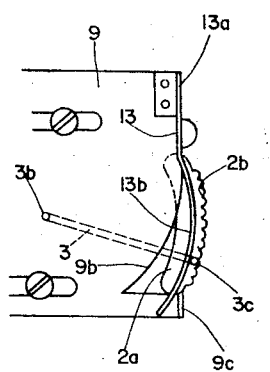
FIGS. 9 and 10 are schematic views similar to FIG. 8, respectively illustrating the clamping means during operation and upon completion of operation.
Figure 10:
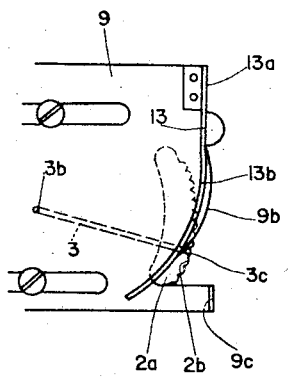

FIGS. 8 to 10 show an embodiment of the clamping means of the exposure meter pointer, usable in the camera according to the present invention. An exposure meter pointer 3 has a pivot pin 3b formed at one end thereof and an indicator portion 3c at the opposite end thereof, and the indicator portion 3c moves around the pivot pin 3b in parallel therewith. The indicator portion 3c is made of elastic bar and loosely fitted in a slot 2a bored on a base plate (not shown) of the exposure meter. The slot 2a has a point receiver 2b formed along one edge thereof, which receiver consists of a number of semicircular recesses disposed in succession, each having the same radius of curvatures as that of the elastic bar constituting the indicator pointer 3c.

An interlocking member 9, which converts the indication of the exposure meter pointer 3 into a corresponding aperture of a lens means (not shown) and a corresponding shutter speed, is actuated by a shutter release and has a smooth cam surface 9b. The interlocking member 9 is normally biased leftwards, as shown in FIG. 8, as long as the shutter release remains inactivated. Upon activation of the shutter release, the interlocking member moves rightwards, by a suitable driving means, so that the cam surface 9b comes in contact with the indicator portion 3c of the point 3c as shown in FIG. 10.

A resilient member 13, such as a leaf spring, has an arcuate portion 13b bent at the same radius of curvature as that of the locus of movement of the indicator portion 3c of the pointer 3. One end 13a of the resilient member 13 is secured to the interlocking member 9, while the free end thereof is forced against a bent portion 9c of the interlocking member 9, as shown in FIG. 8, as long as the shutter release remains inactivated. The elasticity of the resilient member 13 is such that when the shutter release is activated, the indicator portion 3c of the pointer 3 is securedly clamped against the pointer receiver 2b by the arcuate portion 13b of the resilient member, as shown in FIGS. 9 and 10.

In operation of the interlocking mechanism of the aforesaid construction, upon activation of the shutter release, the interlocking member 9 moves rightwards from the normal position, as shown in FIG. 8, and the arcuate portion 13b of the resilient member 13 comes into contact with the indicator portion 3c of the pointer 3 at first. Thus, the indicator portion 3c is forced into a nearby semicircular recess of the pointer receiver 2b, as shown in FIG. 9. Thereafter, the interlocking member 9 continues moving rightwards until its smooth cam surface 9b comes into contact with the indicator portion 3c of the pointer 3, as shown in FIG. 10, so that a proper combination of the shutter speed and the lens aperture can be selected. The angle of obliquity of action of the aforesaid cam surface, or the magnitude of the stroke of the interlocking member 9 for a particular brightness of photographic object, is somewhat limited by various factors, e.g. the radius of curvature of the cam surface 9b of the interlocking member 9, the radius of curvature of the individual semicircular recess of the pointer receiver 2b, or the operative angular position of the pointer 3. However, the stroke can be designed large enough for all practical purposes, and hence, such limitation does not constitute any serious problem.

Figure 11:
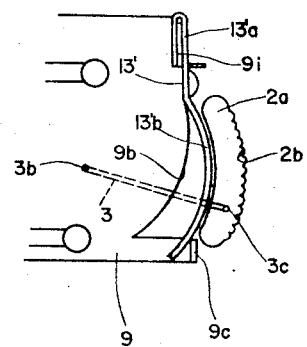
FIG. 11 is a schematic elevation of another embodiment of the clamping means.

FIG. 11 shows another form of the clamping means of the exposure meter pointer, in which a resilient member 13' is not made of a leaf spring but made of an elastic wire having one end 13'b wound around a bent portion 9i of the interlocking member 9. The function of the resilient member 13' of this embodiment is the same as that of the corresponding resilient member 13 of the preceding embodiment, and hence, detailed explanation thereof will not be made here. Instead of securing the separate resilient member 13 to the interlocking member 9, a suitable portion of the interlocking member can be bent and made resilient, so as to provide a built-in leaf spring.

As described in the foregoing, with the clamping means of the aforesaid construction, an arcuate portion of the resilient member, made of a leaf spring or other type spring, acts at first to clamp an indicator portion of the exposure meter pointer onto a pointer receiver, and then a cam surface of the interlocking member comes into contact with the pointer. Accordingly, pointer jumping never occurs to ensure reliable clamping operation. Thus, exposure error can be prevented. Furthermore, the clamping element is disposed as an integral part of the interlocking member having a cam surface, and hence a process of stroke adjustment, which has been necessary with conventional devices, can be dispensed with.

Figure 12:
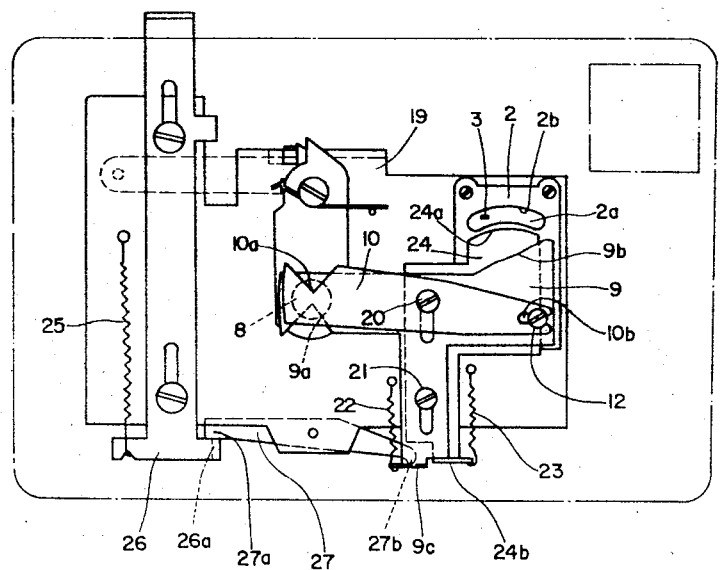
FIG. 12 is a simplified elevation of an automatic lens aperture control means of the camera according to the present invention.

FIG. 12 shows another embodiment of the automatic lens aperture control means usable in the camera according to the present invention. An exposure meter base plate 2 is secured to a camera body 19 and a slot 2a is formed to fit a pointer 3 of the exposure meter in a slidable manner. The slot 2a has a pointer receiver formed at a portion thereof. A first member 9 of the exposure meter interlocking mechanism is vertically slidable with the guide of the pins 20 and 21 secured to the camera body 19, and the member 9 is biased upwards by a spring 22 in such a manner that the magnitude of displacement of the first member 9 is controlled by the operative position of the pointer 3. The exposure meter interlocking member 9 has a cam surface 9b to be brought into contact with the pointer 3 and a V-shaped notch 9a to form a part of the aperture of a photographic lens means 8.

A second member 10 of the exposure interlocking mechanism is pivotally mounted on the pin 20 secured to the camera body 19 and related to the aforesaid first member 9 by the engagement between a bifurcated opening 10b of the first member and a pin 12 secured to the first member 9 and loosely fitted in the bifurcated opening 10b. Thereby, the displacement of the second member 10 is related to the momentum of the first member 9 in one to one relationship in opposite directions. The second member 10 also has a V-shaped notch 10a to form the lens aperture of the lens means 8, in cooperation with the corresponding V-notch 9a of the first member 9.

A pointer holder 24 is slidably mounted on the pins 20 and 21 in vertical direction and biased upwards by a spring 23 so as to follow the upward movement of the first member 9 by the engagement at a lower end bent portion 24b thereof. An arcuate pointer holding portion 24a is formed on the upper end of the pointer holder 24 in a suitable manner.

A shutter release member 26 is mounted on the camera body 19 in a vertically slidable fashion and biased upwards by a spring 25. An intermediate lever 27 pivotally mounted on the camera body 19 has one end 27a engaged with a lower bent portion 26a of the shutter release member 26. When the shutter release member is not activated, the opposite end 27b of the intermediate lever 27 engages with a bent portion 9c of the first member 9, so as to hold the first member at the lower position against the bias force acting thereon.

With the exposure meter interlocking mechanism of the aforesaid construction if the shutter release member 26 is depressed against the bias force acting thereon, the first member 9 moves upwards by the elastic force of the spring 22, responsive to the counterclockwise rotation of the intermediate lever 27. The pointer holding portion 24a of the pointer holding member 24 to move in conjunction with the first member 9 comes into contact with the pointer 3 at first, to force the pointer against the pointer receiver 2b to hold it there. Then, the cam surface 9b of the first member 9 engages with the pointer 3, so that the displacement of the first member 9 is defined by the position of the pointer 3, and at the same time, the momentum of the second member 10 of the exposure interlocking mechanism around the pin 20 is also defined by the engagement of the bifurcated opening 10b with the pin 12 secured on the first member 9. Thus, the lens aperture corresponding to the position of the exposure meter pointer 3 is defined by the V-shaped notches 9a and 10a of the first and second members 9 and 10.

As described in the foregoing, with the automatic lens aperture control mechanism as shown in FIG. 12, the cam means cooperating with the exposure meter acts to regulate the lens aperture mechanism located close to the shutter, and hence, the number of the parts is reduced to allow reduction of the cost. Besides, the elimination of intermediate parts between the exposure meter and the lens aperture results in an improved accuracy. Furthermore, due to the fact that all parts are directly mounted on the camera body, the operative characteristics of the exposure meter interlocking mechanism can be easily regulated simply by adjusting the position of the abutment member secured to the first member thereof.

Although the present invention has been described with a certain degree of particularity, it is understood that the present disclosure has been made only by way of example and that numerous variations and modifications in the details of the construction and the combination and arrangement of parts may be resorted to without departing from the spirit and the scope of the invention as hereinafter claimed.

We claim:

1. A camera comprising a built-in exposure meter including a pointer, a single-blade shutter, and an exposure interlocking mechanism including a first member adapted to be movable in a particular direction and having a cam surface to engage the pointer of said exposure meter so as to control the momentum of the first member responsive to the position of said pointer engaged with said cam surface, said first member being provided with a notch for controlling lens aperture, and a second member coupled directly to said first member to pivot through an angle corresponding to the momentum of said first member, said second member being provided with a notch for controlling lens aperture together with said notch of the first member responsive to the operative position of the pointer, said shutter blade including an abutment member engageable with said first member to regulate shutter speed responsive to the operative position of the pointer.

2. A camera according to claim 1 wherein said second member has a cam surface and a flat portion adjacent said cam surface to control the shutter speed by the selective engagement of said abutment member of said shutter blade with said cam surface and said flat portion responsive to the operative position of the pointer.

3. A camera according to claim 1, further comprising a resilient member integrally mounted on said cam surface of said first member, and a pointer receiver having a plurality of semicircular recesses disposed in succession, said resilient member having an arcuate portion extending at the same radius of curvature as the radius of rotation of said pointer to clamp said pointer against said pointer receiver at a semicircular recess thereof.

4. A camera according to claim 1, further comprising a pointer holding member actuated in conjunction with said first member.